United States Patent [19]

Dunlevy

[11] Patent Number: 5,609,027
[45] Date of Patent: Mar. 11, 1997

[54] REFUELING DEVICE WITH CONSTANT-SPEED AUXILIARY DRIVE

[75] Inventor: F. Paul Dunlevy, Kernersville, N.C.

[73] Assignee: Beta Fluid Systems, L.L.C., Reidsville, N.C.

[21] Appl. No.: 492,982

[22] Filed: Jun. 21, 1995

[51] Int. Cl.$^6$ .................................................. F16D 31/02
[52] U.S. Cl. ........................... 60/396; 60/468; 244/135 A
[58] Field of Search ...................... 60/396, 468; 222/610; 244/135 R, 135 A; 137/899.4; 417/379

[56] References Cited

U.S. PATENT DOCUMENTS

| | | | |
|---|---|---|---|
| 2,735,717 | 2/1956 | Harman | 244/135 A |
| 2,973,714 | 3/1961 | Oishei | 60/396 |

OTHER PUBLICATIONS

Product Advertisement for Refueling Cart, Airport Business, May 1995, p. 26.
Flyer for Refueler Cart, dated 1992–1993, Rampcart, Rampmaster Modular Refueling, P.O. Box 510, Coatsville, PA 19320 USA.
U.S. Air Force Technical Manual for Part No. 015HC–Z001, prepared by Beta Systems, Inc., 1 Oct. 1975 (two pages).
U.S. Air Force Technical Manual for Part No. 062HC–Z001, prepared by Beta Systems, Inc., 15 Jan. 1981 (two pages).
1200 GPM Air–Transportable Hydrant Cart, Product brochure of Beta Systems, Inc., approximately Feb., 1995 (two pages).

Primary Examiner—F. Daniel Lopez
Attorney, Agent, or Firm—William G. Dossé, Esq.; Moore & Van Allen, PLLC

[57] ABSTRACT

A refueling cart, for refueling large aircraft at a major airport having pressurized fuel hydrants at loading/unloading aprons, includes auxiliary facilities on the refueling cart that are usually powered by compressed air that is obtained from compressed-air bottles carried on the cart. To avoid the labor and annoyance of checking and refilling the bottles of compressed air, a small air compressor is carried on the refueling cart and is powered by a fluid motor that is in turn powered by the flowing pressurized fuel. A variable orifice is placed in the path of the fuel flowing from a hydrant to the airplane. The pressure generated across the variable orifice by the flowing fuel pushes a small amount of fuel in a path that bypasses the orifice. That bypass path includes the fluid motor, and the bypassing fuel at the pressure difference generated by the orifice drives the fluid motor. The flow of fuel to the airplane is not constant but varies as the planes tank(s) are filled. The area of the orifice is controlled by a spring-loaded plate that moves under the force of the springs to reduce the area of the orifice as the flow rate of the fuel is reduced (which reduced fuel flow rate would normally result in a reduced pressure difference across the orifice), so as to maintain a nearly constant pressure difference across the orifice over a wide range of fuel flow rates.

10 Claims, 2 Drawing Sheets

CONNECTED TO UNDERGROUND FUEL MAIN

REFUELING DEVICE WITH CONSTANT-SPEED AUXILIARY DRIVE

FIELD OF THE INVENTION

The present invention relates generally to fueling systems, usually for fueling airliners at busy airports; and it relates more particularly to a fuel-flow-powered, constant-speed drive for powering auxiliary equipment used in connection with a fueling system.

BACKGROUND OF THE INVENTION

When fueling large airplanes at the loading/unloading aprons of major airports, fuel is usually supplied at substantial pressure by underground mains to fuel hydrants located at each apron. A fuel cart is rolled up to the airplane and is hooked between the nearest fuel hydrant and the fuel filler connection on the airplane.

The cart performs several services ancillary to providing to transferring fuel, for example, a fuel cart has hose reels, filters, water separators, and a flow meter to measure the quantity of fuel boarded, for billing. Many of these and other ancillary services require the availability of a quantity of compressed air. This is customarily provided by compressed-air storage bottles carried on the cart which are a nuisance to check often and recharge. It would be more convenient if the air could be compressed right on the cart without the weight, noise, and inconvenience of an on-board engine or the added complexity and safety risk of an electrical connection near the fume-laden apron.

There has been some use of the pressurized flow of the fuel from the hydrant to the airplane in order to run some ancillary fueling services. One example is using a fluid motor driven by the flow of pressurized fuel obtained from the apron hydrant and delivered to the airplane in order to drive a fuel-additive injector.

However, in fueling an airplane, the fuel flow is not constant. It slows greatly as the tank nears full. The resulting variable fluid motor output is quite acceptable for a fuel-additive injector which should operate at a rate commensurate with the rate of fuel flow. However, something like an air compressor is best run at a constant speed during the entire fueling operation.

SUMMARY OF THE INVENTION

It is an object of the present invention to provide a constant speed drive for a refueling device.

In accordance with the present invention, a portable device for refueling self-propelled vehicles from a fixed, pressurized fuel source provides a substantially constant pressure difference within the flowing fluid for driving a fluid motor at substantially a constant speed for powering an auxiliary instrumentality on the portable device.

In accordance with another aspect of the present invention, a portable refueling device is provided with auxiliary mechanical power from motor means in response to the flow of fuel, with pressurized fuel being conveyed to the motor means by source means from the higher pressure side of a pressure generating means which generates a constant pressure difference in response to a wide range of rates of flow of the fuel.

BRIEF DESCRIPTION OF THE DRAWINGS

A more complete understanding of the present invention will be had from the following detailed description when considered in conjunction with the accompanying drawings, wherein the same reference numbers refer to the same or corresponding parts shown throughout the several figures, in which.

DETAILED DESCRIPTION OF THE PREFERRED EMBODIMENT

Figure 1:
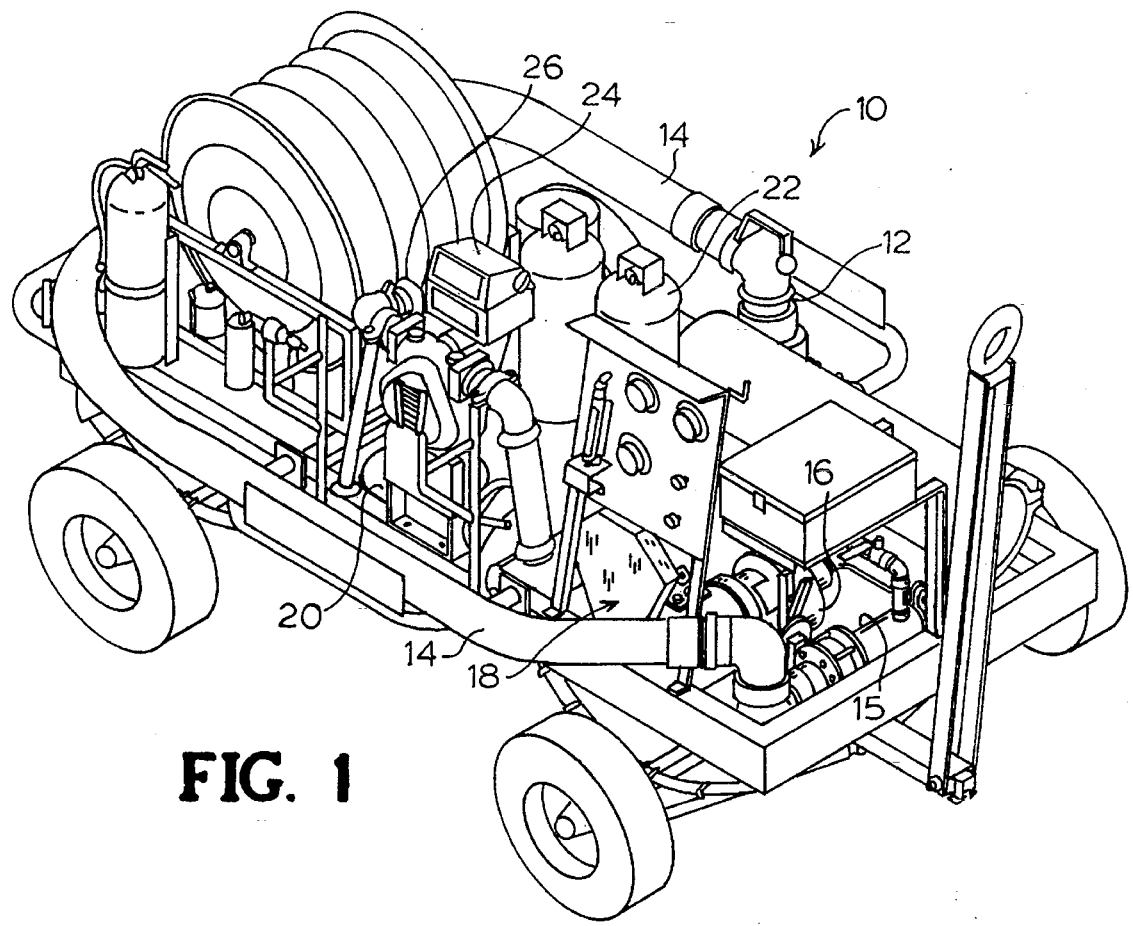
FIG. 1 is an overall, perspective view of a typical airport refueling cart but incorporating the present invention.

Referring now to the drawings and particularly to FIG. 1, a refueling cart 10 embodying the present invention is generally illustrated. Such refueling carts are generally wheeled and are pulled about from one loading/unloading apron to another around the airport, as needed to refuel airplanes.

When conveniently positioned on an apron, a hydrant coupler 12 is removed from the refueling cart 10 and is connected to a pressurized refueling hydrant (not shown) at the apron. Airplane fuel under substantial pressure is available at the refueling hydrant. The hydrant coupler 12 is connected to one end of a flexible hose 14 that conveys the fuel from the hydrant to the piping and apparatus of the refueling cart. When the refueling cart is being transported from one apron to another, the flexible hose 14 is stored compactly (as illustrated in FIG. 1) about the refueling cart 10.

The fuel from the flexible hose 14 first flows through an inlet pipe 15 having a variable orifice, which is described more fully below in connection with FIGS. 3, 4, and 5. A source bypass pipe (more fully described below in connection with a fluid motor, a sink bypass pipe, and an air compressor, all in connection with FIG. 2) carries some of the fuel from upstream of the variable orifice to the input of a fluid motor 16. A sink bypass pipe carries the fuel from the output of the fluid motor back to the inlet pipe 15 but downstream of the variable orifice. In this way, the pressurized fuel that bypasses the variable orifice drives the fluid motor 16.

The flow of fuel through the variable orifice and to the airplane generates a pressure difference across the variable orifice. As described more fully below, in connection with FIG. 2, that pressure difference drives the bypass fuel around the orifice, through the source and sink bypass pipes, and through the fluid motor 16 to drive the output shaft of the fluid motor. The output of the fluid motor 16 drives an air compressor 18 to compress air for delivery to a compressed-air tank or reservoir 20.

The fuel also passes through or is carried past the other conventional components of the refueling cart 10, such as a pressure surge suppressor 22, a fuel quantity meter or register 24, and various control valves 26, to the rotating, sealed input of a hose reel. A fueling nozzle (not shown) on the outer end of the reeled length of hose is attached to the fuel input connectors of the airplane (not shown).

Figure 2:
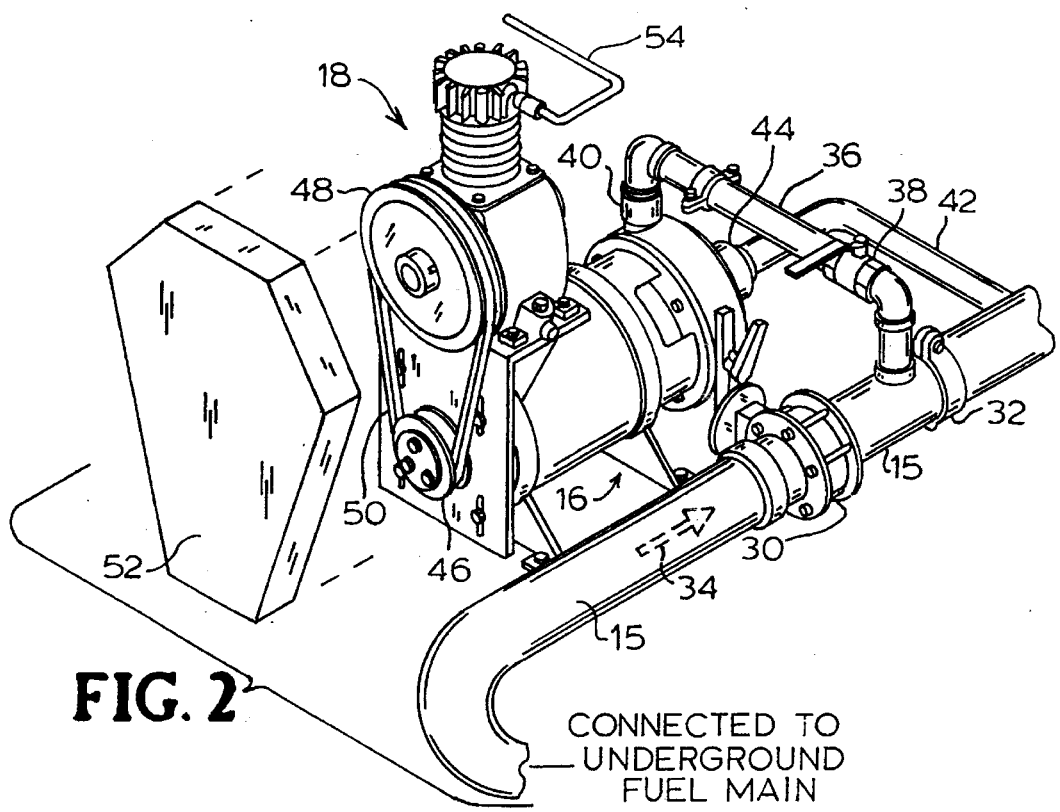
FIG. 2 is a partial perspective view showing a more detailed portion of the refueling cart using the present invention.
Figure 3:
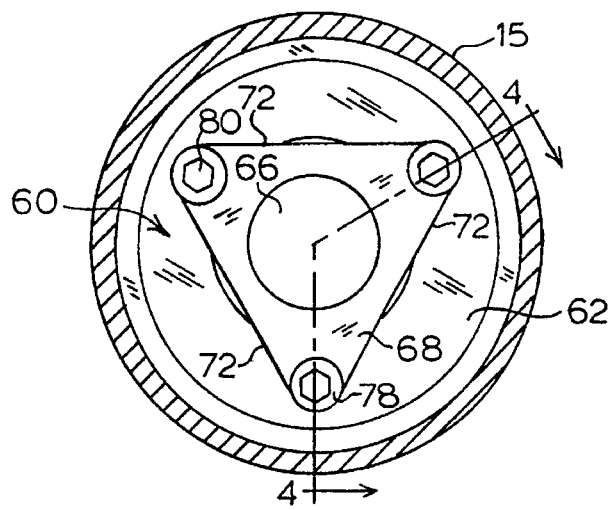
FIG. 3 is an end view of a variable orifice positioned inside the fuel flow pipe of a refueling cart.

Referring now to FIG. 2, the fuel inlet pipe 15 has a shut-off valve 30 to help prevent spillage. The inlet pipe 15 also has a variable orifice (see FIGS. 3, 4, and 5) placed inside the inlet pipe 15, in the region of a coupling 32. An arrow 34, in FIG. 2, illustrates the direction of fuel flow in the inlet pipe 15.

A source bypass pipe 36 extends from the inlet pipe 15 and carries fuel from the inlet pipe upstream of the variable orifice (see FIGS. 3, 4, and 5) that is inside the inlet pipe in the region of the coupling 32. There is a shut-off valve in the source bypass pipe 36. The other end of the source bypass pipe 36 is connected to the fluid input 40 of the fluid motor 16. A sink bypass pipe 42 conveys fuel from the fluid outlet 44 of the fluid motor back to the inlet pipe 15, but downstream of the variable orifice.

Therefore, as fuel flows in the inlet pipe 15, that fuel flowing through the variable orifice generates a pressure differential across the variable orifice. Therefore, fuel in the inlet pipe 15 upstream of the variable orifice is at a higher pressure than the fuel in the inlet pipe downstream of the inlet orifice. Consequently, that pressure differential forces fuel to try to bypass the variable orifice, through the source bypass pipe 36, through the fluid motor 16, and through the sink bypass pipe 42 back to the inlet pipe 15. That pressure differential and resultant flow of fuel through the fluid motor 16 causes rotation of the output shaft of the fluid motor. That output shaft (not shown) of the fluid motor 16 is connected to and turns a drive pulley 46.

The drive pulley 46 rotates a driven pulley 48 by means of a drive belt 50. The driven pulley 48 is connected to the drive shaft of the air compressor 18, an auxiliary instrumentality on the refueling cart, for utilizing the mechanical output power of the fluid motor 16. A protective pulley cover 52 (shown exploded from the pulleys 46 and 48 in FIG. 2) partially obscures the compressor 18 in the view of the refueling cart 10 depicted in FIG. 1. The air compressor 18 is conventional and is commercially available.

Rotation of the driven pulley and the drive shaft of the air compressor 18 causes the air compressor to compress air and propel that compressed air down a pressure tube 54 to the compressed-air reservoir 20. The compressed air in the reservoir 20 is thus available for conventional refueling-cart auxiliary devices that require compressed air.

Briefly a fluid motor can be considered as a fluid pump operating in reverse. That is, instead of supplying rotating power to the shaft of a pump to move fluid under pressure, the reverse occurs. The moving, pressurized fluid rotates the shaft of the fluid motor. Such fluid motors are conventional and commercially available.

Air compressors are conventionally operated by a constant-speed rotary shaft input. However, the flow of fuel from a hydrant, through a refueling cart, and to an airplane's fuel tanks is definitely NOT constant. The fuel flow is high during the early portion of the filling of a tank. However, as the tank fills, the fuel flow rate is decreased to prevent accidents that might occur if the tank would become full during a period of high fuel flow rate. Consider what can happen when the automatic flow cut-off device fails at the gas pump when filling the gas tank of an automobile.

During this considerable proportion of the filling time an airplane fuel tank, when fuel flow is reduced, the lower fuel flow rate through the orifice would result in a substantially lower pressure differential across the orifice. Therefore, there would be substantially lower pressure driving substantially less fuel in the source and sink bypass pipes 36 and 42 to drive the fluid motor 16. Consequently, the fluid motor 16 would run more slowly and thus run the air compressor more slowly. This is unacceptable.

In an effort to provide constant rotary speed and power output from the fluid motor 16 to a load such as the compressor 18, over a wide range of flow rate of the pressurized driving fluid fuel in the inlet pipe 15, the orifice is made of variable geometry so as to produce substantially the same pressure drop even though the rate of fuel flow changes considerably. When the airplane's tank is empty, the fuel is flowing rapidly.. Therefore, the orifice should introduce very little restriction into the path of flow of the fuel. Just enough pressure drop and bypass flow to the fluid motor 16 should be produced across and around the orifice in order to drive the fluid motor at the desired speed.

Later on, when the airplanes's tank has filled substantially, fuel flow is substantially slower, and the orifice is more constricted so as to produce the same pressure drop and bypass flow to the fluid motor in order to drive the compressor at the same rate. Therefore, as the orifice is made more constricted, less fuel flows through the orifice but the same amount of fuel at substantially the same pressure differential flows around the orifice and through the fluid motor 16.

Referring now to FIG, 3, a variable orifice 60 is shown inside of the inlet pipe 15. The view of FIG. 3 is from downstream of the orifice 60 with the fuel flow coming out of the drawing, toward the viewer. The coupling 32 has been omitted from FIG. 3, for simplicity. The line 4—4 shows how the orifice 60 is viewed in cross section in FIGS. 4 and 5, with a false symmetry shown by the angle of the line 4—4 in FIG. 3, in order to avoid confusion.

Figure 4:
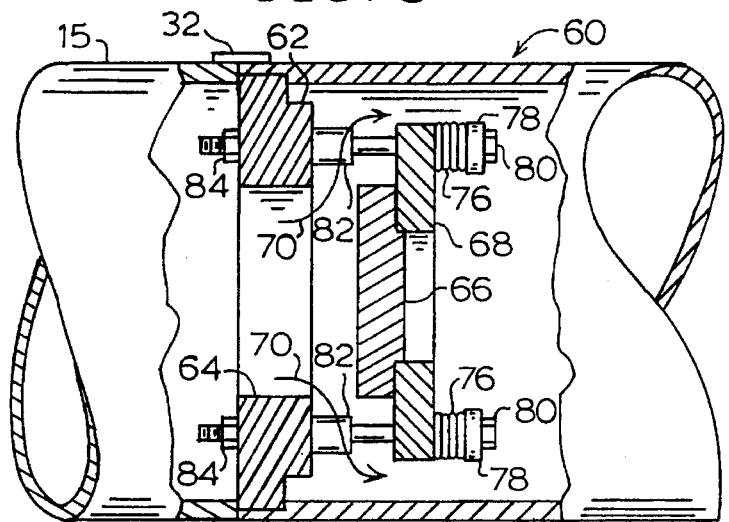
FIG. 4 is a partial cross-sectional view taken along lines 4—4 of FIG. 3, showing the variable orifice at its full open condition.

Referring now to FIG. 4, the variable orifice 60 is shown positioned within a broken-away section of the inlet pipe 15. The pipe 15 is discontinuous at the region of the variable orifice 60 and the two sections of the pipe 15 are held together by the coupling 32, which is shown only schematically in FIGS. 4 and 5. The coupling 32 is the same type of grooved coupling that is commonly used in sprinkler systems and other types of pressure piping. Also, the interior of the left end of the right section of the pipe 15, as viewed in FIGS. 4 and 5, is bored out slightly to accept the variable orifice 60.

An orifice plate 62 (shown in cross section), which is the base of the variable orifice 60, has a small step in its perimeter so as to be nested into the bored out portion of the end of the right section of the pipe 15. In this way, the variable orifice 60 is held in place within the pipe 15.

The orifice plate 62 has a central opening 64, preferably of circular shape. All of the fuel, that does not bypass the orifice to flow through the fluid motor 16, must pass through the opening 64, in a direction from left to right, as shown in FIG. 4.

A circular plate 66 together with a triangular carrier 68 constitute a spring-biased orifice restricting device which can move toward and away from the orifice plate 64 to vary the effective area of flow of the orifice.

As shown in FIG. 4, the planar surface of the circular plate 66 is positioned at a substantial distance from the central opening 64, depicting a high rate of fuel flow. The effective orifice area is the circumference of the circular opening 64 multiplied by the distance from the end of the circular opening 64 to the planar surface of the circular plate 66 that is nearest to that end of the circular opening 64. That effective orifice area is an annulus or the surface of a cylinder having the same diameter as the circular opening 64 and having a height equal to the distance from the rightmost end of the circular opening (as viewed in FIG. 4) to the nearest planar surface of the circular plate 66.

While an annulus usually refers to a circular shape, it will be evident to one of ordinary skill in the art that the circular opening 64 can actually be rectangular or any other convenient shape, all of which is encompassed within the generic meaning of the term annulus, as used herein. The circular plate 66 need not necessarily be circular but can be any convenient shape commensurate with the shape of the circular opening 64, and having dimensions of at least those of the circular opening 64.

The flow of fuel through the variable orifice 60 is generally in the path depicted by the arrows 70 in FIG. 4. While it appears in FIG. 4 that there is further constriction between the triangular carrier 68 and the inside of the inlet pipe 15, that is not the case, as will be seen by reference to FIG. 3. In FIG. 3, considerable area is shown between the flats 72 of the triangular carrier 68 and the inside of the inlet pipe 15. Note, once again, that the line 4—4 of FIG. 3 is not straight but forms an angle.

Figure 5:
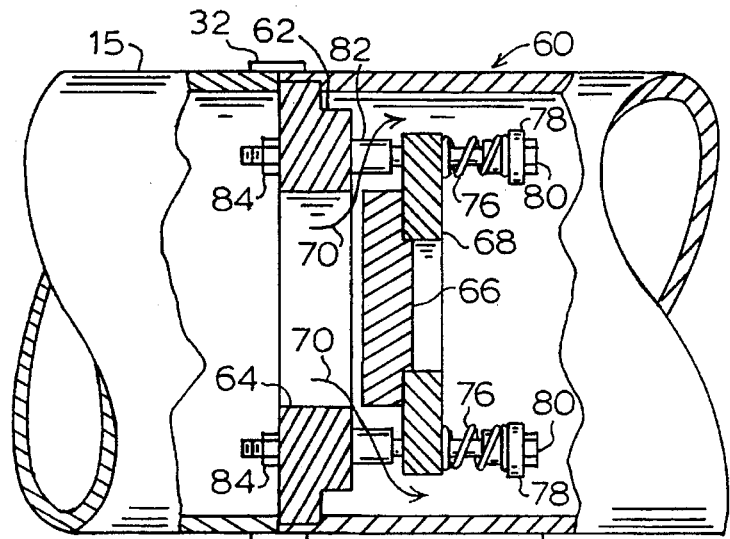
FIG. 5 is a partial cross-sectional view similar to FIG. 4, except that the variable orifice is shown at nearly its full closed condition.

Three springs 76, bias the triangular carrier 68 toward the left (as viewed in FIGS. 4 and 5). The high rate of flow of fluid in the inlet pipe 15, as depicted in FIG. 4, pushes the circular plate 64 away from the nearest end of the circular opening 64, against the bias of the springs 76. One end of each spring 76 bears against the right side of the triangular carrier 68. The other end of each spring 76 is wrapped around the shank of a spring retainer 78, the diameter of said shank being less than the inside diameter of the associated spring. A cap of each spring retainer 78 has a diameter larger than the inside diameter of the spring. Therefore, each spring 76 is compressed between the cap of its associated spring retainer 78 and the triangular carrier 68.

A machine screw 80 holds each spring retainer 78 and extends through the spring retainer, the associated spring 76, a clearance hole in the triangular carrier 68, an associated cylindrical spacer 82, and the orifice plate 62, to be held in place by a nut 84. Therefore, the machine screws 80 serve as guides for leftward and rightward movement of the triangular carrier 68, allowing the triangular carrier and the circular plate 66 to move freely back and forth under the opposing influences of the springs 76 and the rate of flow of the fuel.

Referring now to FIG. 5, the triangular carrier 68 and the circular plate 66 are shown in the position that would result from a low rate of fuel flow. The bias of the springs 76 has pushed the triangular carrier 68 to the left against the reduced force of the fuel flow on the circular plate 66, constricting the effective area of the variable orifice in order to maintain a relatively constant pressure differential across the variable orifice, even in the face of a reduced rate of flow of fuel.

It will be evident to one of ordinary skill in the hydraulic and mechanical arts that if there is a great difference in the bias force exerted by the springs 76 between the condition depicted in FIG. 4 and the condition depicted in FIG. 5, there will be a commensurately great difference in the pressure differential across the variable orifice as it closes from the condition of FIG. 4 to the condition of FIG. 5. Such a great difference in spring bias force would result from using a spring of relatively high spring rate or spring constant and a low prestress or precompression. That is, the spring is too stiff, and it isn't compressed enough in the condition of FIG. 5.

Therefore, in order to keep the pressure differential across the variable orifice as nearly constant as conveniently possible over a wide range of fuel flow rates, the springs 76 should have a low spring rate, ie., be relatively "soft" and should have a relatively long uncompressed length. Therefore, the deflection of the springs 76 from the position depicted in FIG. 4 to the position depicted in FIG. 5 will be a small percentage of their uncompressed length and result in a minimal change in the force exerted by the springs on the triangular carrier 68.

While the form of apparatus herein described constitutes a preferred embodiment of this invention, it is to be understood that the invention is not limited to this precise form of apparatus, and that changes may be made therein without departing from the scope of the invention which is defined in the appended claims.

I claim:

1. A portable device for refueling self-propelled vehicles from a fixed, pressurized fuel source, including a source of nearly constant-speed auxiliary mechanical power derived from the flowing, pressurized fuel, comprising:

a variable orifice through which a bulk of the pressurized fuel flows, for generating a pressure difference, the effective area of the orifice being variable so as to generate substantially the same pressure difference over a wide range of flow rates of the fuel flowing through the variable orifice and not bypassing the variable orifice;

a fluid motor driven by the fuel bypassing the variable orifice under pressure from the pressure difference generated by the fuel flowing through the variable orifice, said fluid motor producing mechanical output power in response to the flowing fuel;

an auxiliary instrumentality, on the portable device, for utilizing the mechanical output power of the fluid motor.

2. A portable device according to claim 1 wherein the auxiliary instrumentality is an air compressor.

3. A portable device according to claim 1 wherein the variable orifice comprises an opening through which the fuel must flow and a plate large enough to substantially reduce the effective area of the orifice, that extends between the opening and a perimeter of the plate as the plate nears the opening, said plate being spring-biased in a direction opposite to a direction of fuel flow so as to restrict the effective orifice area more at lower rates of fuel flow, the flowing fuel tending to move the plate against the spring bias.

4. A constant-speed auxiliary mechanical power source for a portable refueling device which conveys fuel from a pressurized fuel source to refuel self-propelled vehicles comprising:

motor means for generating mechanical power in response to flow of fuel from an input to an output of said motor means;

pressure generating means located in the fuel conveyance path for generating a constant pressure difference within the fuel in response to a wide range of rates of flow of the fuel;

source means for conveying fuel from the higher pressure side of the pressure generating means to said motor means; and sink means for conveying fuel from said motor means to the lower-pressure side of the pressure generating means.

5. A constant-speed auxiliary mechanical power source for a portable refueling device according to claim 4, wherein said pressure generating means comprises a variable-area orifice positioned in the fuel conveyance path of the portable refueling device.

6. A constant-speed auxiliary mechanical power source for a portable refueling device according to claim 5, wherein the variation of the effective area of said orifice is accomplished by a plate which is spring-biased in a direction opposite to direction of fuel flow.

7. A constant-speed auxiliary mechanical power source for a portable refueling device according to claim 6, wherein the spring-biased plate has a substantially-planar surface which is substantially perpendicular to the direction of flow of the fuel.

8. A constant-speed auxiliary mechanical power source for a portable refueling device according to claim 7, wherein the effective area of the orifice is an annulus defined by an opening through which the fuel flows and the substantially-planar surface of the plate, said effective area being generally proportional to the distance between the downstream end of the opening and the substantially-planar surface of the plate.

9. A constant-speed auxiliary mechanical power source for a portable refueling device according to claim 5, wherein said source means comprises a pipe extending from upstream of the orifice to the input of the motor means.

10. A constant-speed auxiliary mechanical power source for a portable refueling device according to claim 9, wherein said sink means comprises a pipe extending from downstream of the orifice to the output of the motor means.

* * * * *